United States Patent
Ukrainczyk

(10) Patent No.: US 6,632,025 B2
(45) Date of Patent: Oct. 14, 2003

(54) HIGH POWER EXPANDED BEAM CONNECTOR AND METHODS FOR USING AND MAKING THE HIGH POWER EXPANDED BEAM CONNECTOR

(75) Inventor: Ljerka Ukrainczyk, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/147,728

(22) Filed: May 16, 2002

(65) Prior Publication Data

US 2003/0012513 A1 Jan. 16, 2003

Related U.S. Application Data

(60) Provisional application No. 60/303,610, filed on Jul. 5, 2001.

(51) Int. Cl.[7] .................................. G02B 6/38
(52) U.S. Cl. .......................................... 385/70
(58) Field of Search ............................. 385/70, 58, 55, 385/33

(56) References Cited

U.S. PATENT DOCUMENTS

| | | | |
|---|---|---|---|
| 4,497,536 A | 2/1985 | Payne et al. | 350/96.21 |
| 4,737,006 A | 4/1988 | Warbrick | 350/96.18 |
| 4,781,431 A | 11/1988 | Wesson et al. | 350/96.21 |
| 4,854,663 A | 8/1989 | Borsuk et al. | 350/96.2 |
| 4,925,267 A * | 5/1990 | Plummer et al. | 385/74 |
| 4,969,702 A * | 11/1990 | Anderson | 385/33 |
| 5,185,836 A * | 2/1993 | Baker | 385/61 |
| 5,293,438 A | 3/1994 | Konno et al. | 385/35 |
| 5,926,593 A * | 7/1999 | Asami et al. | 385/74 |
| 6,312,163 B1 * | 11/2001 | Ono et al. | 385/70 |
| 6,438,290 B1 * | 8/2002 | Bietry et al. | 385/33 |

OTHER PUBLICATIONS

Mary Adcox, Splicing and Fiber Assembly Compatibility for Non–Zero Dispersion–Shifted Fiber and Standard Single–Mode Fiber, Presented at NOC/EC 2000, pp. 1–7.

* cited by examiner

Primary Examiner—Lynn Feild
Assistant Examiner—Brian S. Webb
(74) Attorney, Agent, or Firm—Timothy M. Schaeberle; William J. Tucker

(57) ABSTRACT

A high power expanded beam and methods for making and using the high power expanded beam connector are described herein. Basically, the high power expanded beam connector includes a first lensed optical fiber that is optically coupled to a second lensed optical fiber but physically separated from the second lensed optical fiber. The first lensed optical fiber is capable of expanding a light beam traveling therein and outputting a collimated light beam. The second lensed optical fiber is capable of receiving the collimated light beam and focusing the received light beam such that the light beam travels from the first lensed optical fiber to the second lensed optical fiber. In a similar manner, the high power expanded beam connector can transmit a light beam from the second lensed optical fiber to the first lensed optical fiber.

25 Claims, 7 Drawing Sheets

HIGH POWER EXPANDED BEAM CONNECTOR AND METHODS FOR USING AND MAKING THE HIGH POWER EXPANDED BEAM CONNECTOR

CLAIMING BENEFIT OF PRIOR FILED PROVISIONAL APPLICATION

This application claims the benefit of U.S. Provisional Application Ser. No. 60/303,610, filed on Jul. 5, 2001 and entitled "Expanded Beam Connector for High Power Application" which is incorporated by reference herein.

BACKGROUND OF THE INVENTION

1. Field of the Invention

The present invention relates in general to optical connectors and, in particular, to a high power expanded beam connector that can be used to couple optical fibers in high power applications.

2. Description of Related Art

Manufacturers of optical connectors have been trying to design an optical connector that can be used in high power applications to couple optical fibers. Traditional butt-joint connectors are not considered suitable for high power applications because any particle contamination from the cleaning process or any glue from the packaging which is left at or near the joint could cause catastrophic failure. Accordingly, there is a need for a high power optical connector that addresses the aforementioned problem of the traditional butt-joint connector. This need and other needs are addressed by the high power expanded beam connector and methods of the present invention.

BRIEF DESCRIPTION OF THE INVENTION

The present invention includes a high power expanded beam connector that can be used to couple optical fibers in high power applications. Basically, the high power expanded beam connector includes a first lensed optical fiber that is optically coupled to a second lensed optical fiber but physically separated from the second lensed optical fiber. The first lensed optical fiber is capable of expanding a light beam traveling therein and outputting a collimated light beam. The second lensed optical fiber is capable of receiving the collimated light beam and focusing the received light beam such that the light beam travels from the first lensed optical fiber to the second lensed optical fiber. In a similar manner, the high power expanded beam connector can transmit a light beam from the second lensed optical fiber to the first lensed optical fiber. The present invention also includes methods for making and using the high power expanded beam connector.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 1–11, there is disclosed a preferred embodiment of a high power expanded beam connector 100 and preferred methods 900 and 1100 for making and using the high power expanded beam connector 100. Although the high power expanded beam connector 100 is described as optically connecting only one pair of fibers, it should be understood that the high power expanded beam connector 100 can be used to connect one or more pairs of fibers (see FIG. 10). Accordingly, the high power expanded beam connector 100 and the preferred methods 900 and 1100 should not be construed in such a limited manner.

Figure 3:
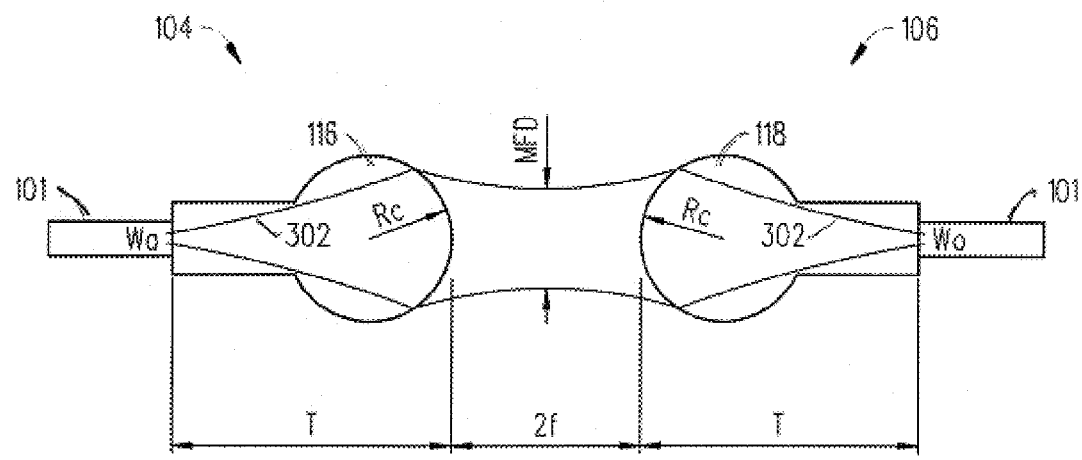
FIG. 3 is a block diagram illustrating various geometrical dimensions of two lensed optical fibers.

Basically, the high power expanded beam connector 100 includes a first lensed optical fiber 104 that is optically coupled to a second lensed optical fiber 106 but physically separated from the second lensed optical fiber 106. The first lensed optical fiber 104 is capable of expanding (diverging) a light beam 302 traveling therein and outputting a collimated light beam 302 (FIG. 3 shows the light beam 302—which is collimated when between lensed fibers 104 and 106). The second lensed optical fiber 106 is capable of receiving the collimated light beam 302 and focusing (converging) the received light beam 302 such that the light beam 302 travels from the first lensed optical fiber 104 to the second lensed optical fiber 106. In a similar manner, the high power expanded beam connector 100 can transmit a light beam 302 from the second lensed optical fiber 106 to the first lensed optical fiber 104.

Figure 1:
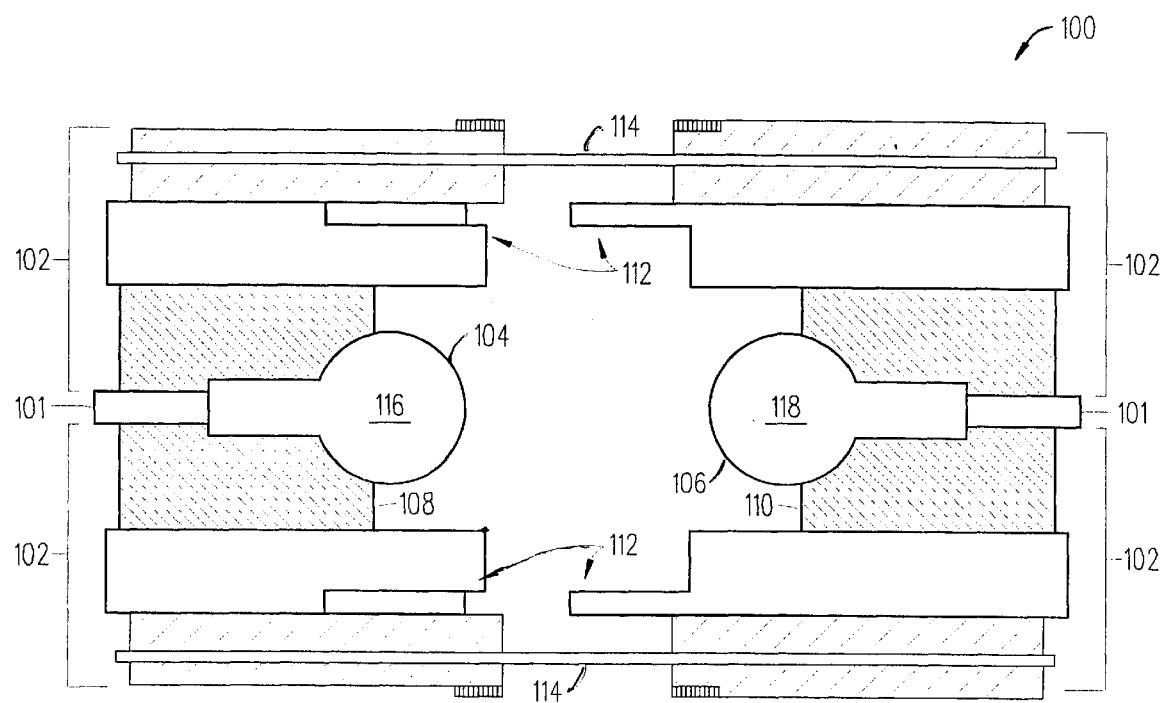
FIG. 1 is a block diagram showing an exploded view of a high power expanded beam connector in accordance with the present invention.

Referring to FIG. 1, there is a block diagram showing an exploded view of the high power expanded beam connector 100 that can be used to optically connect one or more pairs of fibers 101 (e.g., single mode fibers such as Corning's SMF-28™). The high power expanded beam connector 100 can be used with a wide variety of optical amplifiers including, for example, Raman amplifiers which operate at or above 100 mW. As described above, traditional butt-joint connectors are not considered suitable in high power applications because any particle contamination from the cleaning process or any glue from the packaging which is left at or near the joint could cause catastrophic failure. However, the high power expanded beam connector 100 is well suited for high power applications (e.g., ≧100 mW) because the beam is expanded from an effective area of about 90 $\mu m^2$ ($\lambda$=1550 nm, Corning's SMF-28™) to more than 20,000 $\mu m^2$ at the convex surface of the lens 116 and 118. In other words, the high power expanded beam connector 100 is not as sensitive to contaminates like dirt and glue because of the larger beam area which implies a much lower power density. As such, the lack of physical contact between the lensed optical fibers 104 and 106 improves power handling and minimizes the impact of contaminates like dirt and glue.

As illustrated in FIG. 1, the high power expanded beam connector 100 includes a package 102 that supports the first lensed optical fiber 104 and the second lensed optical fiber 106. In particular, the package 102 supports and aligns the first lensed optical fiber 104 and the second lensed optical fiber 106 such that they face each other and are separated by a predetermined distance from each other to minimize insertion loss.

The package 102 includes a first ferrule 108, a second ferrule 110 and a mating alignment fixture 112. The first ferrule 108 supports and protects the first lensed optical fiber 104. Likewise, the second ferrule 110 supports and protects the second lensed optical fiber 106. The mating alignment fixture 112 along with one or more alignment pins 114 (two shown) are capable of aligning and holding the first ferrule 108 and the second ferrule 110 in place such that the first lensed optical fiber 104 is separated a predetermined distance from the second lensed optical fiber 106. The alignment pins 114 also help to align the two lensed optical fibers 104 and 106.

Figure 2:
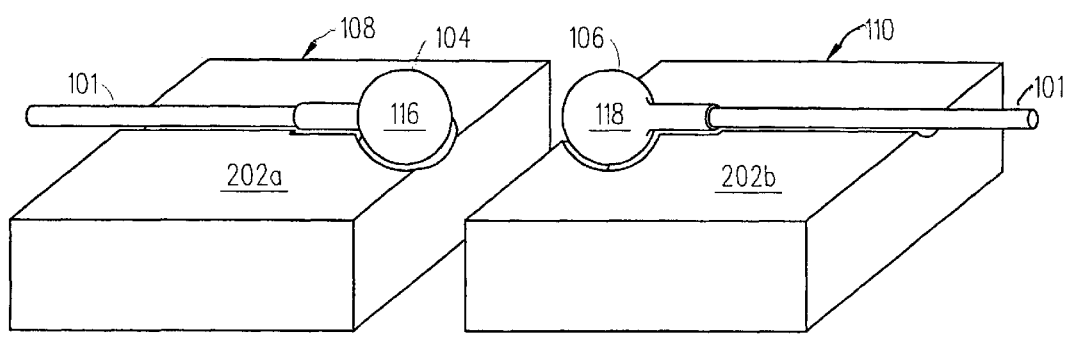
FIG. 2 is a perspective view of the bottom portions of two exemplary ferrules used to support the lensed optical fibers of the high power expanded beam connector shown in FIG. 1.

The first ferrule 108 and the second ferrule 110 can be made from many different materials and can take many different forms. One such form is shown in FIG. 1, where convex lens 116 and 118 of the first lensed optical fiber 104 and the second lensed optical fiber 106 extend from the first ferrule 108 and the second ferrule 110, respectively. Another such form is shown in FIG. 2, where the convex lens 116 and 118 of the first lensed optical fiber 104 and the second lensed optical fiber 106 do not extend from the first ferrule 108 and the second ferrule 110, respectively. Instead, the first ferrule 108 and the second ferrule 110 are each made of a top piece (not shown) and a bottom piece 202a and 202b that are epoxied together around the first lensed optical fiber 104 and the second lensed optical fiber 106. In the second example, the first ferrule 108 and the second ferrule 110 can be butted against one another and still maintain the predetermined distance between the first lensed optical fiber 104 and the second lensed optical fiber 106.

In operation, the high power expanded beam connector 100 includes the first lensed optical fiber 104 which is capable of expanding a light beam 302 traveling therein and outputting a collimated light beam 302 (FIG. 3 shows light beam 302). The second lensed optical fiber 106 is capable of receiving the collimated light beam 302 and focusing the received light beam 302 such that the light beam 302 travels from the first lensed optical fiber 104 to the second lensed optical fiber 106. In a similar manner, the high power expanded beam connector 100 can also transmit a light beam 302 from the second lensed optical fiber 106 to the first lensed optical fiber 104. Details about the first lensed optical fiber 104 and the second lensed optical fiber 106 are provided below with respect to FIGS. 3–8.

Referring to FIG. 3, there is a block diagram illustrating various geometrical dimensions of two lensed optical fibers 104 and 106. The geometrical dimensions of the lensed optical fibers 104 and 106 dictate the distance the first lensed optical fiber 104 is to be separated from the second lensed optical fiber 106. It should be understood that the lens 116 and 118 are perfect collimators when:

$$T=R_c^*(n/n-1)+\Phi$$

where T=thickness of lens 116 and 118;
$R_c$=radius curvature of lens 116 and 118;
n=index of refraction of lens 116 and 118.
$\Phi$=phase shift For example at 1550 m and using silica (n=1.444), the lens 116 and 118 are a perfect collimators when $T/R_c$=3.25. In practice, the thickness of spherical lens 116 and 118 needs to be increased by the diffractive focal shift because the lensed optical fibers 104 and 106 are not a point source and the spherical lens portion 116 and 118 are very small so the diffraction effects are large. Thus, in practice the $T/R_c$ ratio is greater than 3.25.

An exemplary high power expanded beam connector 100 could have a geometry with a beam waist of 50 to 100 microns away from each surface of the lens 116 and 118, thus giving the lens 116 to lens 118 separation of 100–200 microns. Such a high power expanded beam connector 100 would have lens 116 and 118 with a 227 micron radius of curvature ($R_c$), a 765 micron thickness (T) and mode field diameters (MFDs) at the beam waist of 85 microns. This design of the spherical lens portion 116 and 118 allows for a high tolerance to lateral and axial misalignment in the high power expanded beam connector 100 (see FIGS. 8A–8C).

Figure 4:
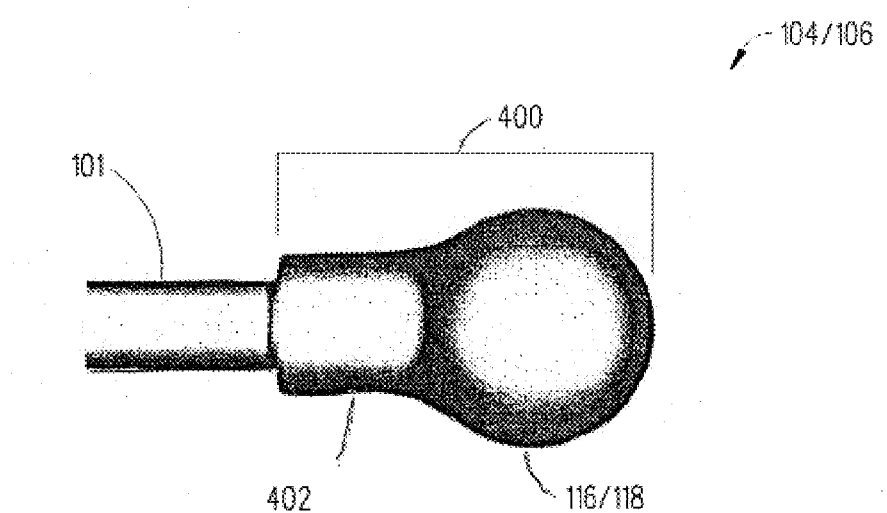
FIG. 4 is a micrograph of a lensed optical fiber that can be incorporated within the high power expanded beam connector shown in FIG. 1.

Referring to FIG. 4, there is a micrograph of an exemplary lensed optical fiber 104 and 106 that can be used in the present invention. The glass lens 400 (e.g., plano-convex collimating lens, lens member) as shown is made from glass that is transparent at the wavelength of interest and fusion spliced to an optical fiber 101. The glass lens 400 has a coefficient of thermal expansion (CTE) that matches or closely matches the CTE of the optical fiber 101. Essentially, the glass lens 400 has a thickness "T" and a radius of curvature "$R_c$" (see FIG. 3). More specifically, the glass lens 400 includes a throat portion 402 and a spherical lens portion 116 and 118. The lensed optical fibers 104 and 106 can be made by splicing one end of the throat portion 402 to the optical cable 101. Then a fusion splicer with a tungsten filament can be used to form the convex lens 116 and 118 at the other end of the throat portion 402. A more detailed discussion about the glass lens 400 is provided in Corning's U.S. patent application Ser. No. 09/812,108 the contents of which are incorporated herein by reference.

In the preferred embodiment, the lensed optical fibers 104 and 106 and in particular the lens 116 and 118 are made of borosilicate glass. The spherical lens portion 116 and 118 that are made of borosilicate glass do not suffer from birefringence, whereas spherical lens that are made from silica are birefringent which contributes to polarization dependant losses. Moreover, the performance of the high power expanded beam connector 100 can be enhanced when the lens 116 and 118 are made from borosilicate glass. Because, the fusion splicing of the fibers 101 to a borosilicate glass causes thermal core broadening which enlarges the mode field diameter (MFD) and increases the tolerances for lateral misalignment of the lensed optical fibers 104 and 106. In addition, the production process of the lens 116 and 118 is much more reproducible when borosilicate glass is used instead of silica.

Figure 5:
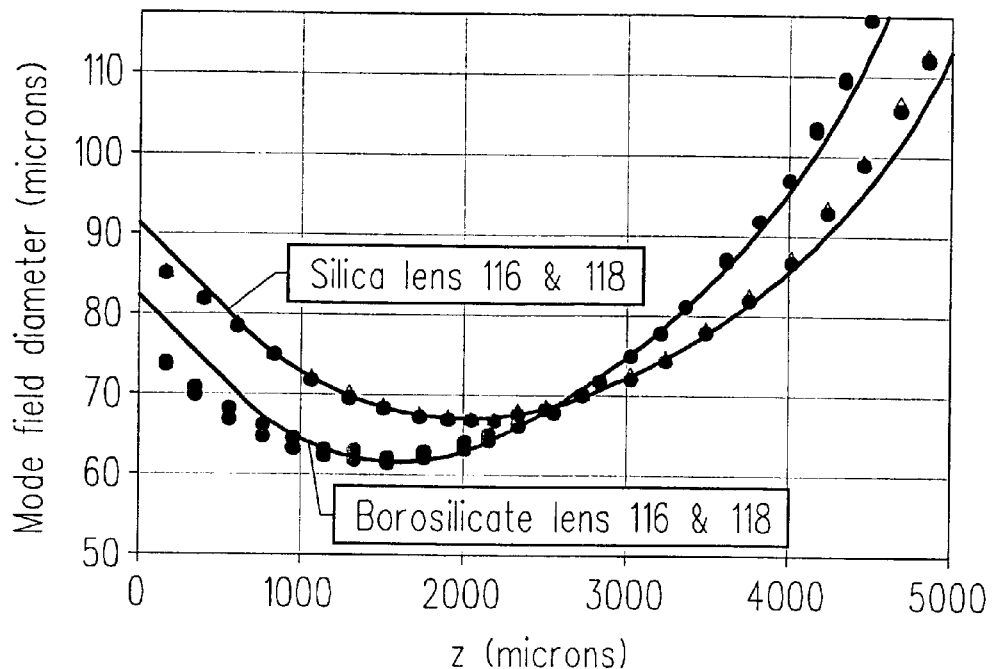
FIG. 5 is a graph showing the effect of thermal core broadening on lensed optical fibers that have silica plano convex lens and borosilicate plano convex lens.

For a more a detailed comparison between the lensed optical fibers 104 and 106 made from borosilicate glass and the lensed optical fibers 104 and 106 made from silica see FIG. 5. In particular, the effect of thermal core broadening can be seen with reference to FIG. 5. Data points represent measured MFD in x and y directions for a silica and borosilicate lens attached to Corning's SMF-28. The solid lines represent the fit of a gaussian beam model. The data indicates that the core of Corning's SMF-28™ has broadened to about 13.6 μm from nominal fiber mode field of 10.4 μm.

Figure 6A:
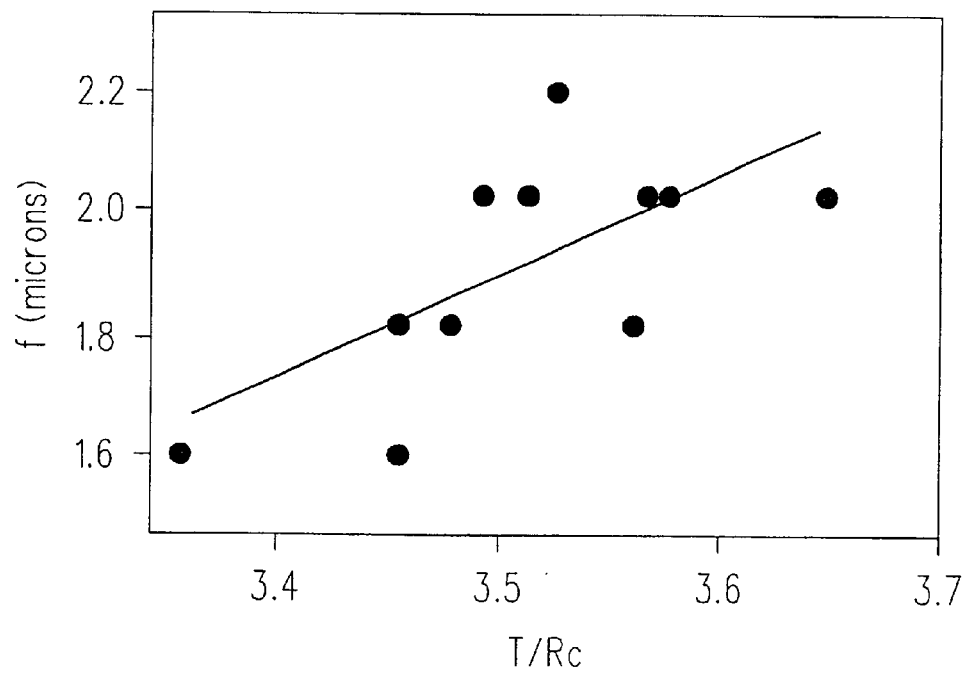
FIGS. 6A and 6B are graphs showing the relationship between different lens geometries and different distances to beam waste for signal mode fibers (e.g., Corning's SMF-28™) at λ=1550 nm.
Figure 6B:
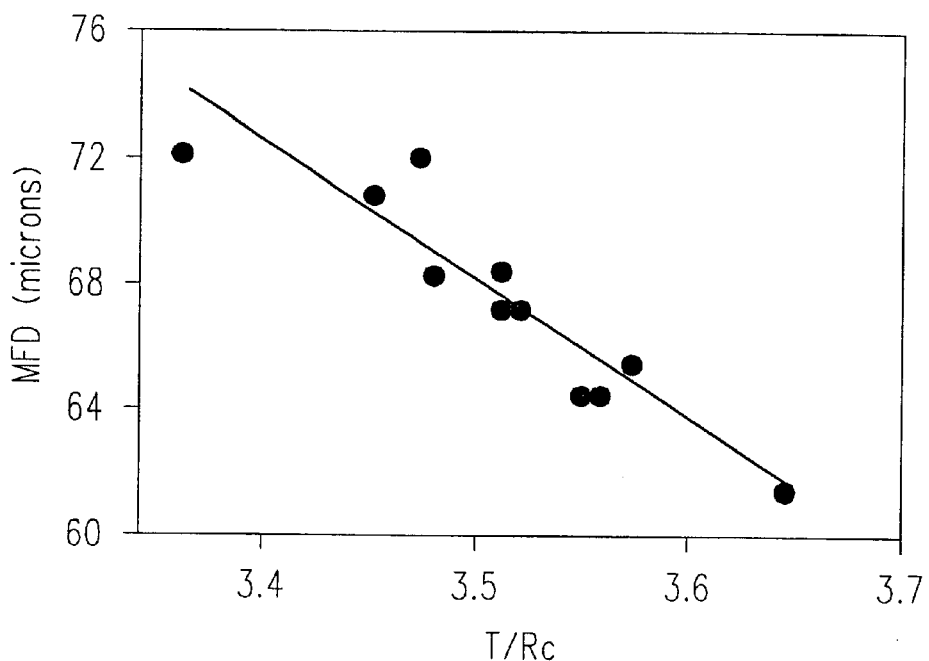

Referring to FIGS. 6A and 6B, there are illustrated graphs showing the relationship between different geometries of lens 104 and 106 and different distances to beam waist for signal mode fibers (e.g., Corning's SMF-28™) at λ=1550 nm. This type of information helps one to determine the desired spacing between the spherical lens portion 116 and 118 in the high power expanded beam connector 100.

Referring back to FIGS. 1 and 3, the spherical lens portion 116 and 118 can also be covered with an antireflection (AR) coating (not shown) which functions to prevent the light beam 302 from reflecting back into fiber 101 when the light beam 302 hits the surface of the lens 116 and 118. In an experiment conducted by the inventors, the excess loss or coupling efficiency of AR coated and uncoated lensed optical fibers 104 and 106 was measured by facing the lens 116 and 118 towards each other and aligning the lens 116 and 118 to get the maximum power reading. It should be noted that the typical coupling efficiency of antireflection coated lensed optical fibers 104 and 106 is <0.2 dB/pair. During the experiment, one lens 116 was connected to a broadband source and the other lens 118 was connected to a detector. Table 1 shows the return loss measurements of AR coated and uncoated lens 116 and 118:

TABLE 1

| Lens no. | 1542 nm return loss (-dB) | Glass | AR coating |
| --- | --- | --- | --- |
| 593 | 63.6 | OVD silica | Yes |
| 594 | 68.7 | OVD silica | Yes |
| 597 | 66.0 | HPFS | Yes |
| 598 | 64.8 | HPFS | Yes |
| 620 | 57.5 | Borosilicate | Yes |
| 621 | 62.1 | Borosilicate | Yes |
| 547 | 41.0 | OVD silica | No |
| 548 | 41.1 | OVD silica | No |
| 503 | 41.2 | HPFS | No |
| 504 | 40.9 | HPFS | No |
| 1253 | 40.1 | Borosilicate | No |
| 1254 | 40.9 | Borosilicate | No |

As can be seen from Table 1, the return loss measurements at 1542 nm shown that the average loss of AR coated lens 116 and 118 is below −60 dB and uncoated lens 116 and 118 is approximately −40 dB. For a test sample of 6 AR coated lens 116 and 118, the return loss measurements ranged between −57 and −69 dB where only one lens had a return loss measurement that was greater than −60 dB. These measurements were performed on relatively small lens 116 and 118 with an $R_c$~225 microns and T~800 microns. A more detailed analysis of return loss measurements (back reflection loss) is provided below with respect to FIG. 7.

Figure 7:
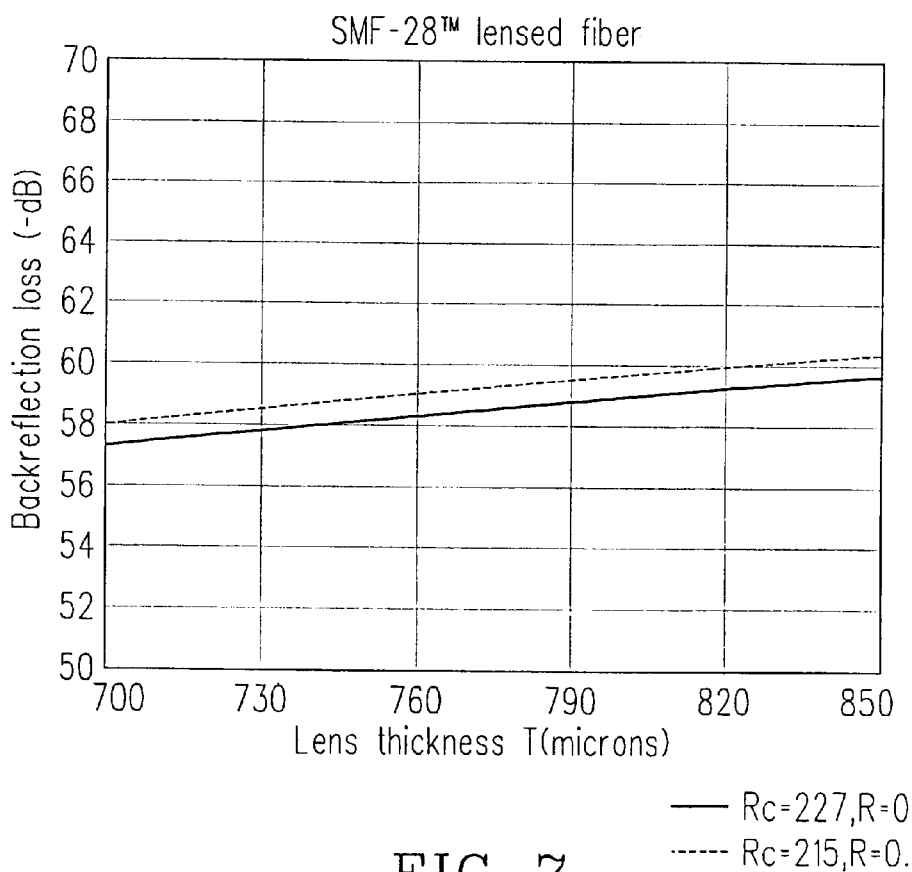
FIG. 7 is a graph showing calculated back reflections or return losses of different lensed optical fibers.

Referring to FIG. 7, there is illustrated a graph showing calculated back reflections or return losses of different lensed optical fibers 104 and 106. Basically, it can be seen that for AR coated lenses 104 and 106 with a coating that has 0.25% reflectivity, it is possible to achieve back reflection greater than 55 dB. Lenses 104 and 106 with a smaller radius of curvature will have a lower back reflection, at the same lens thickness. This adds flexibility to the design of the lens 104 and 106 which allows one to maximize the back reflection for a desired lens-to-lens separation.

Figure 8A:
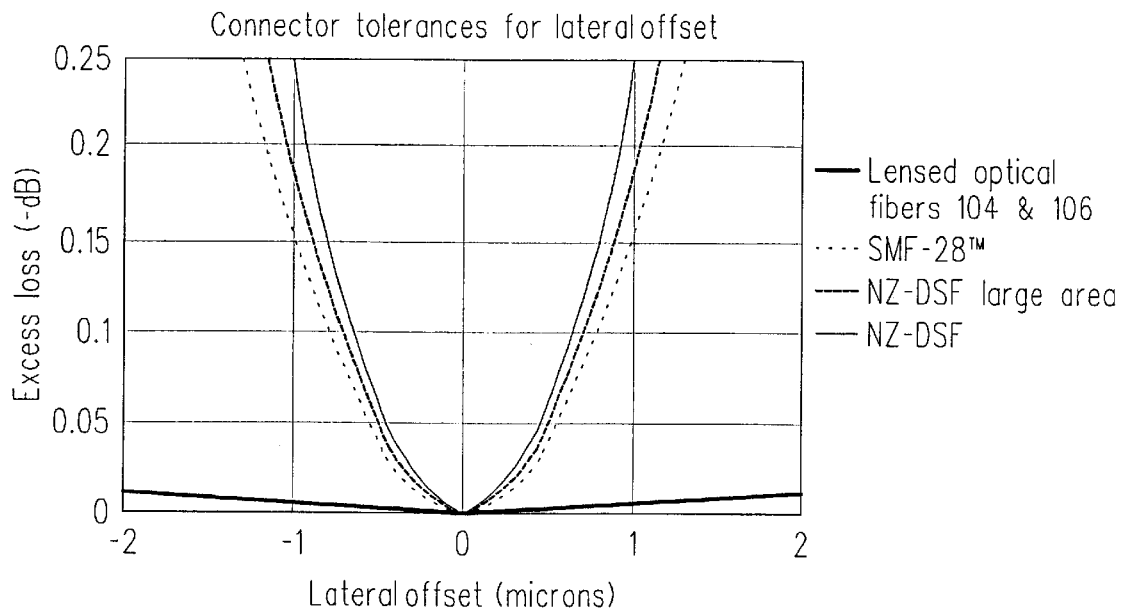
FIGS. 8A–8C are graphs showing various tolerances (e.g., lateral offset, angular offset, longitudinal displacement) associated with the high power expanded beam connector shown in FIG. 1.
Figure 8B:
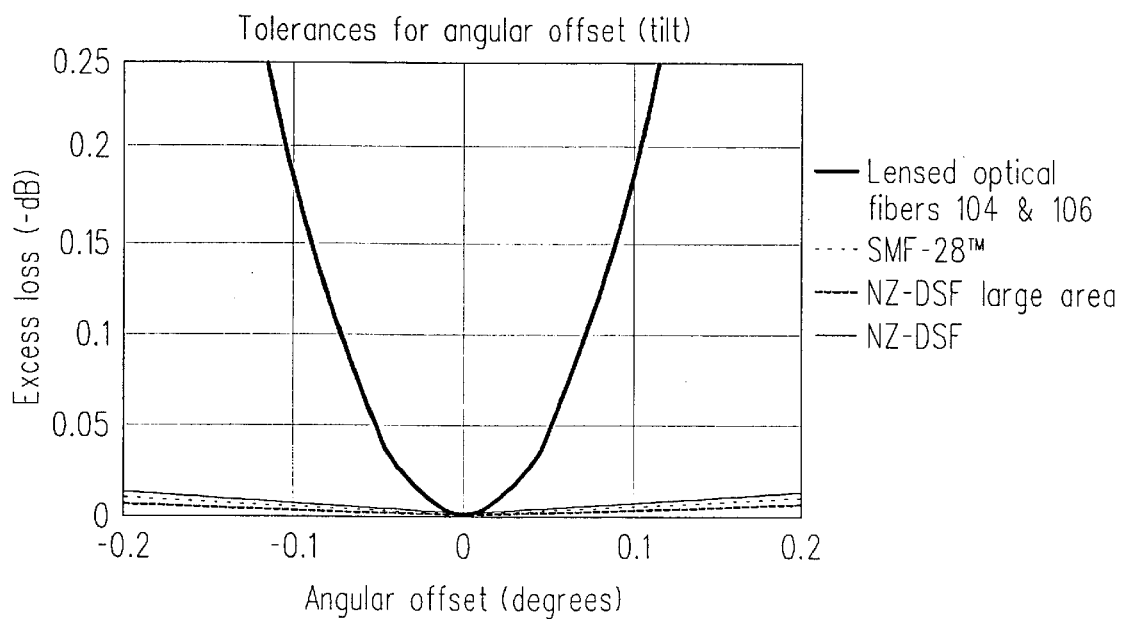
Figure 8C:
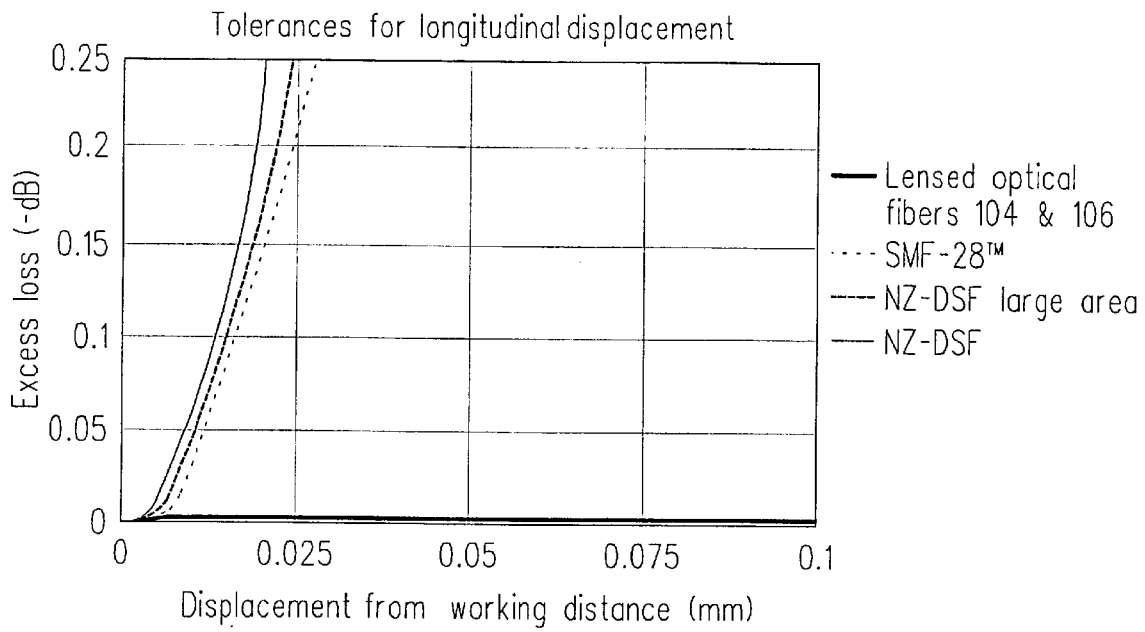

Referring to FIGS. 8A–8C, there are graphs showing various tolerances (e.g., lateral offset, angular offset, longitudinal displacement) associated with the high power expanded beam connector 100. In particular, the graphs show the effect of lateral, angular and longitudinal misalignment on loss in the high power expanded beam connector 100 with lensed optical fibers 104 and 106 (MFD=62 microns) and in the traditional butt-joint connectors of single mode fibers such as SMF-28™ (MFD=10.4), NZ-DSF with large area (MFD=9.6 microns) and NZ-DSF (MFD=8.4 microns). In FIGS. 8A and 8C, it can be seen that lateral and longitudinal tolerances are much better in the high power expanded beam connector 100 (e.g., lensed optical fibers 104 and 106) compared to traditional butt-joint connectors. However, in FIG. 8B it can be seen that the tolerance to angular misalignment is much worse in the high power expanded beam connector 100. The smaller tolerance to angular misalignment is due to the larger MFD of the high power expanded beam connector 100. As such, the mechanical design of the high power expanded beam connector 100 should not allow for tilting. Moreover, it is preferred to have a short working distance (e.g., lens-to-lens separation) because angular misalignment induces less lateral misalignment if the working distance is short.

Figure 9:
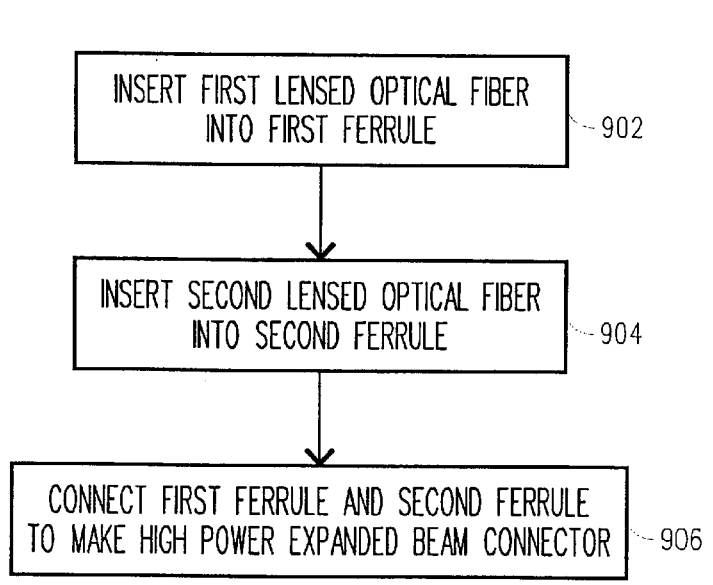
FIG. 9 is a flowchart illustrating the steps of a preferred method for making the high power expanded beam connector shown in FIG. 1.

Referring to FIG. 9, there is a flowchart illustrating the steps of a preferred method 900 for making the high power expanded beam connector 100. To make the high power expanded beam connector 100, the first lensed optical fiber 104 is inserted (step 902) into the first ferrule 108. Likewise, the second lensed optical fiber 106 is inserted (step 904) into the second ferrule 110. In the preferred embodiment, the first lensed optical fiber 104 and the second lensed optical fiber 106 would be coated with an antireflection coating to reduce return loss (backreflection).

Thereafter, the first ferrule 108 is connected (step 906) to the second ferrule 110. This can be accomplished in several ways. For example, the mating alignment fixture 112 as shown in FIG. 1 along with one or more alignment pins 114 (two shown) can be used to align and hold the first ferrule 108 and the second ferrule 110. Alternatively, the first ferrule 108 and the second ferrule 110 can be connected to each other using, for example, a keyed bayonet coupling or a coupling receptacle. As a result, the first ferrule 108 and the second ferrule 110 are secured to one another in a manner such that the first lensed optical fiber 104 is aligned and separated a predetermined distance from the second lensed optical fiber 106.

After connecting the first ferrule 108 to the second ferrule 110, the high power expanded beam connector 100 and in particular the first lensed optical fiber 104 is capable of expanding a light beam 302 traveling therein and outputting a collimated light beam 302 towards the second lensed optical fiber 106. The second lensed optical fiber 106 upon receiving the collimated light beam 302 focuses the received light beam 302 such that the light beam 302 travels from the first lensed optical fiber 104 to the second lensed optical fiber 106. In a similar manner, the high power expanded beam connector 100 can also transmit a light beam 302 from the second lensed optical fiber 106 to the first lensed optical fiber 104.

Figure 10:
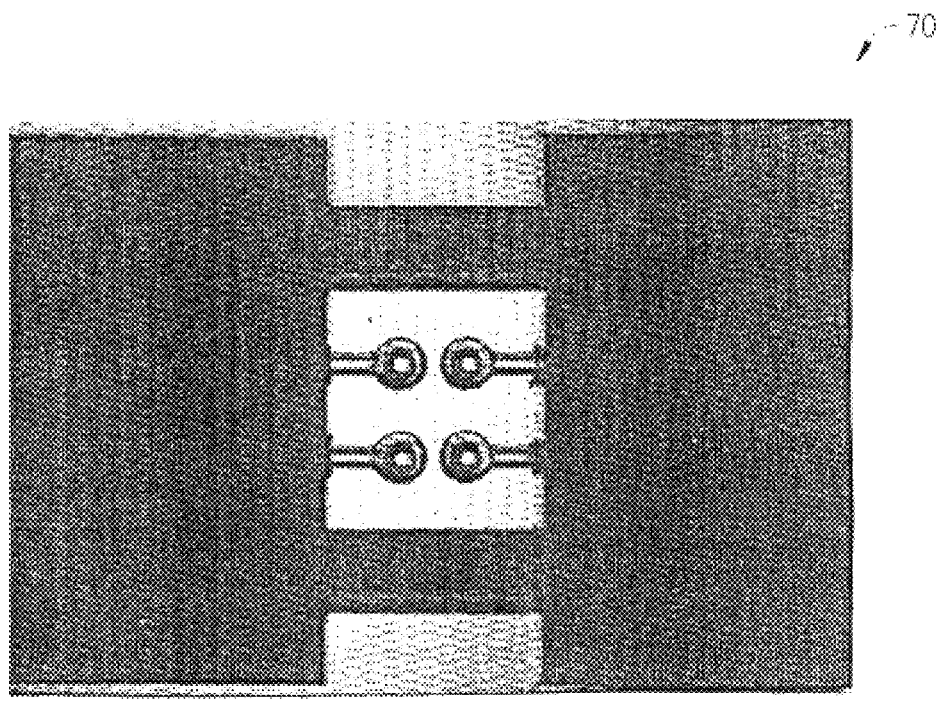
FIG. 10 is a photograph showing a cross-sectional side view of an exemplary high power expanded beam connector including two pairs of lensed optical fibers in accordance with the present invention.

Referring to FIG. 10, there is a photograph showing a cross-sectional side view of an exemplary high power expanded beam connector 100 including two pairs of lensed optical fibers in accordance with the present invention.

Figure 11:
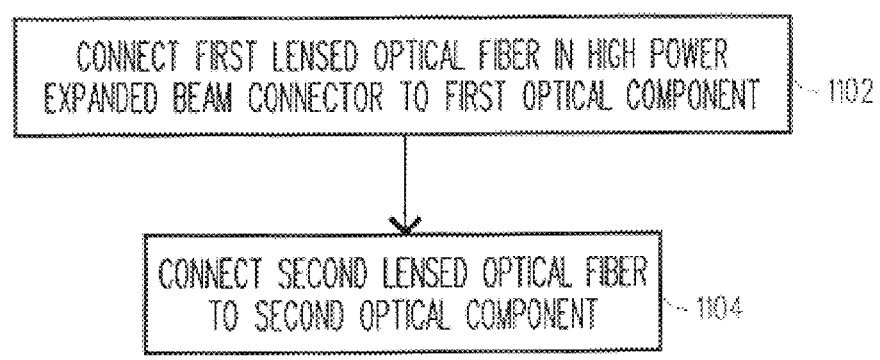
FIG. 11 is a flowchart illustrating the steps of a preferred method for using the high power expanded beam connector shown in FIG. 1.

Referring to FIG. 11, there is a flowchart illustrating the steps of a preferred method 1100 for using the high power expanded beam connector 100. Essentially, the first lensed optical fiber 104 of the high power expanded beam connector 100 is connected (step 1102) to a first optical component (e.g., amplifier). Likewise, the second lensed optical fiber 106 of the high power expanded beam connector 100 is connected (step 1104) to a second optical component (e.g., amplifier).

Since, the high power expanded beam connector 100 is already assembled. The first lensed optical fiber 104 is capable of expanding a light beam 302 traveling therein and outputting a collimated light beam 302 towards the second lensed optical fiber 106. The second lensed optical fiber 106 upon receiving the collimated light beam 302 focuses the received light beam 302 such that the light beam 302 travels from the first lensed optical fiber 104 to the second lensed optical fiber 106. In a similar manner, the high power expanded beam connector 100 can transmit a light beam 302 from the second lensed optical fiber 106 to the first lensed optical fiber 104.

Although only one embodiment of the present invention have been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A high power expanded beam connector comprising:
   a first lensed optical fiber; and
   a second lensed optical fiber optically coupled to said first lensed optical fiber but physically separated a predetermined distance from said first lensed optical fiber, wherein said first lensed optical fiber and said second lensed optical fiber each include an optical fiber that was fusion spliced to a plano-convex borosilicate lens that includes a throat portion and a spherical lens portion, wherein the fusion splicing of the optical fibers to the piano-convex borosilicate lenses enlarges the mode field diameters of said first and second lensed optical fibers which increases the tolerance for lateral misalignment between said first and second lensed optical fibers.

2. The high power expanded beam connector of claim 1, further comprising a package capable of supporting said first lensed optical fiber and said second lensed optical fiber.

3. The high power expanded beam connector of claim 2, wherein said package further includes:
   a first ferrule capable of supporting said first lensed optical fiber;
   a second ferrule capable of supporting said second lensed optical fiber; and
   a mating alignment fixture capable of aligning and holding said first ferrule and said second ferrule such that said first lensed optical fiber is separated the predetermined distance from said second lensed optical fiber.

4. The high power expanded beam connector of claim 1, wherein the throat portions and the spherical lens portions each have a geometry that dictates the predetermined distance said first lensed optical fiber is to be physically separated from said second lensed optical fiber.

5. The high power expanded beam connector of claim 1, wherein said first lensed optical fiber and said second lensed optical fiber are capable of being used in a high power application operating at or greater than 100 mW because a light beam is expanded from an area in the range of 90 $\mu m^2$ to more than 20,000 $\mu m^2$ at one of the spherical lens portions of the plano-convex borosilicate lenses.

6. The high power expanded beam connector of claim 1, wherein said high power expanded beam connector is an arrayed high power expanded beam connector.

7. The high power expanded beam connector of claim 1, wherein said expanded beam connector is associated with an optical amplifier.

8. The high power expanded beam connector of claim 1, wherein said first lensed optical fiber is capable of outputting a collimated light beam and said second lensed optical fiber is capable of receiving the collimated light beam because each of the spherical lens portions have a geometry and index of refraction in accordance with the following equation:

$$T = R_c^*(n/n-1) + \Phi$$

where T=thickness of the respective spherical lens portion
   $R_c$=radius curvature of the respective spherical lens portion
   n=index of refraction of the respective spherical lens portion
   $\Phi$=phase shift and wherein said thickness of each spherical lens portion is then increased by at least one diffractive focal shift to take into account the particular geometries of said first and second lensed optical fibers.

9. A high power expanded beam connector used in high power applications operating at or greater than 100 mW, said high power expanded beam connector comprising:
   a first lensed optical fiber including a first optical fiber that was fusion spliced to a first plano-convex borosilicate lens that includes a throat portion and a spherical lens portion, wherein said first lensed optical fiber is capable of expanding a light beam and outputting a collimated light beam;
   a second lensed optical fiber including a second optical fiber that was fusion spliced to a second piano-convex borosilicate lens that includes a throat portion and a spherical lens portion, wherein said second lensed optical fiber is separated a predetermined distance from said first lensed optical fiber, wherein said second lensed optical fiber is capable of receiving the collimated light beam and focusing the received light beam such that the light beam travels from said first lensed optical fiber to said second lensed optical fiber, wherein the fusion splicing of the first and second optical fibers to the first and second plano-convex borosilicate lenses enlarges the mode field diameters of said first and second lensed optical fibers which increases the tolerance for lateral misalignment between said first and second lensed optical fibers.

10. The high power expanded beam connector of claim 9, further comprising a package capable of supporting and aligning said first lensed optical fiber and said second lensed optical fiber in a manner such that said first lensed optical fiber and said second lensed optical fiber face each other and are physically separated the predetermined distance.

11. The high power expanded beam connector of claim 9, wherein the throat portions and the spherical lens portions each have a geometry that dictates the predetermined distance said first lensed optical fiber is to be physically separated from said second lensed optical fiber.

12. The high power expanded beam connector of claim 9, wherein each spherical lens portion is coated with an anti-reflection coating.

13. The high power expanded beam connector of claim 9, wherein said high power expanded beam connector includes more than one pair of said first and second lensed optical fibers.

14. The high power expanded beam connector of claim 9, wherein said high power expanded beam connector is associated with a Raman amplifier.

15. The high power expanded beam connector of claim 9, wherein said first lensed optical fiber is capable of outputting the collimated light beam and said second lensed optical fiber is capable of receiving the collimated light beam because each of the spherical lens portions have a geometry and index of refraction in accordance with the following equation:

$$T=R_c*(n/n-1)+\Phi$$

where T=thickness of the respective spherical lens portion
$R_c$=radius curvature of the respective spherical lens portion
n=index of refraction of the respective spherical lens portion
$\Phi$=phase shift and wherein said thickness of each spherical lens portion is then increased by at least one diffractive focal shift to take into account the particular geometries of said first and second lensed optical fibers.

16. A method for making a high power expanded beam connector, said method comprising the steps of:
inserting a first lensed optical fiber into a first ferrule, wherein said first lensed optical fiber includes a first optical fiber that was fusion spliced to a first plano-convex borosilicate lens that includes a throat portion and a spherical lens portion;
inserting a second lensed optical fiber into a second ferrule, wherein said second lensed optical fiber includes a second optical fiber that was fusion spliced to a second piano-convex borosilicate lens that includes a throat portion and a spherical lens portion; and
securing said first ferrule and said second ferrule such that said first lensed optical fiber and said second lensed optical fiber are aligned and separated a predetermined distance from one another thus enabling said first lensed optical fiber to expand a light beam traveling therein and then to output a collimated light beam towards said second lensed optical fiber which receives the collimated light beam and focuses the received light beam such that the light beam travels from said first lensed optical fiber to said second lensed optical fiber, wherein the fusion splicing of the first and second optical fibers to the first and second piano-convex borosilicate lenses enlarges the mode field diameters of said first and second lensed optical fibers which increases the tolerance for lateral misalignment between said first and second lensed optical fibers.

17. The method of claim 16, wherein the throat portions and the spherical lens portions each have a geometry that dictates the predetermined distance said first lensed optical fiber is to be physically separated from said second lensed optical fiber.

18. The method of claim 16, wherein each spherical lens portion is coated with an antireflection coating.

19. The method of claim 16, wherein said first lensed optical fiber and said second lensed optical fiber are capable of being used in a high power application operating at or greater than 100 mW because the light beam is expanded from an area in the range of 90 $\mu m^2$ to more than 20,000 $\mu m^2$ at the spherical lens portion of the plano-convex borosilicate lens in the first lensed optical fiber.

20. The method of claim 16, wherein said first lensed optical fiber is capable of outputting the collimated light beam and said second lensed optical fiber is capable of receiving the collimated light beam because each of the spherical lens portions have a geometry and index of refraction in accordance with the following equation:

$$T=R_c*(n/n-1)+\Phi$$

where T=thickness of the respective spherical lens portion
$R_c$=radius curvature of the respective spherical lens portion
n=index of refraction of the respective spherical lens portion
$\Phi$=phase shift and wherein said thickness of each spherical lens portion is then increased by at least one diffractive focal shift to take into account the particular geometries of said first and second lensed optical fibers.

21. A method for using a high power expanded beam connector, said method comprising the steps of:
connecting a first lensed optical fiber of said expanded beam connector to a first optical component, wherein said first lensed optical fiber includes a first optical fiber that was fusion spliced to a first plano-convex borosilicate lens that includes a throat portion and a spherical lens portion; and
connecting a second lensed optical fiber of said expanded beam connector to a second optical component, wherein said second lensed optical fiber includes a second optical fiber that was fusion spliced to a second plano-convex borosilicate lens that includes a throat portion and a spherical lens portion, and wherein said first lensed optical fiber and said second lensed optical fiber are aligned and separated a predetermined distance from one another thus enabling said first lensed optical fiber to expand a light beam traveling therein and to output a collimated light beam towards said second lensed optical fiber which receives the collimated light beam and focuses the received light beam such that the light beam travels from said first optical component to said second optical component, wherein the fusion splicing of the first and second optical fibers to the first and second piano-convex borosilicate lenses enlarges the mode field diameters of said first and second lensed optical fibers which increases the tolerance for lateral misalignment between said first and second lensed optical fibers.

22. The method of claim 21, wherein the throat portions and the spherical lens portions each have a geometry that dictates the predetermined distance said first lensed optical fiber is to be physically separated from said second lensed optical fiber.

23. The method of claim 21, wherein each spherical lens portion is coated with an antireflection coating.

24. The method of claim 21, wherein said first lensed optical fiber and said second lensed optical fiber are capable of being used in a high power application operating at or greater than 100 mW because the light beam is expanded from an area in the range of 90 $\mu m^2$ to more than 20,000 $\mu m^2$ at the spherical lens portion of the piano-convex borosilicate lens in the first lensed optical fiber.

25. The method of claim 21, wherein said first lensed optical fiber is capable of outputting the collimated light beam and said second lensed optical fiber is capable of receiving the collimated light beam because each of the spherical lens portions have a geometry and index of refraction in accordance with the following equation:

$$T=R_c*(n/n-1)+\Phi$$

where T=thickness of the respective spherical lens portion
$R_c$=radius curvature of the respective spherical lens portion
n=index of refraction of the respective spherical lens portion
Φ=phase shift and wherein said thickness of each spherical lens portion is then increased by at least one diffractive focal shift to take into account the particular geometries of said first and second lensed optical fibers.

* * * * *